United States Patent
Hirokawa

(10) Patent No.: US 12,373,941 B2
(45) Date of Patent: Jul. 29, 2025

(54) IMAGE PROCESSING METHOD, PROGRAM, IMAGE PROCESSING DEVICE, AND OPHTHALMIC SYSTEM

(71) Applicant: NIKON CORPORATION, Tokyo (JP)

(72) Inventor: Mariko Hirokawa, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 282 days.

(21) Appl. No.: 17/071,495

(22) Filed: Oct. 15, 2020

(65) Prior Publication Data
US 2021/0027467 A1 Jan. 28, 2021

Related U.S. Application Data

(63) Continuation of application No. PCT/JP2019/016651, filed on Apr. 18, 2019.

(30) Foreign Application Priority Data

Apr. 18, 2018 (JP) .................. 2018-080272

(51) Int. Cl.
| | |
|---|---|
| G06T 7/00 | (2017.01) |
| G06V 10/50 | (2022.01) |
| G06V 10/75 | (2022.01) |
| G06V 40/18 | (2022.01) |

(52) U.S. Cl.
CPC ............ *G06T 7/0012* (2013.01); *G06V 10/50* (2022.01); *G06V 10/751* (2022.01); *G06V 40/193* (2022.01); *G06T 2207/30041* (2013.01); *G06T 2207/30104* (2013.01); *G06V 2201/03* (2022.01)

(58) Field of Classification Search
CPC ......... G06T 7/0012; G06T 2207/30041; G06T 2207/30104; G06T 2207/10024; G06T 2207/10061; G06T 2207/20021; G06T 7/68; G06V 10/60; G06V 10/751; G06V 40/193; G06V 2201/03; G06V 10/50
See application file for complete search history.

(56) References Cited

U.S. PATENT DOCUMENTS

| | | | | |
|---|---|---|---|---|
| 10,438,364 | B2 * | 10/2019 | Karino | .................... G06T 7/38 |
| 2009/0324052 | A1 | 12/2009 | Nowinski | |
| 2013/0182219 | A1 * | 7/2013 | Numajiri | ............... A61B 3/117 |
| | | | | 351/210 |
| 2014/0016096 | A1 * | 1/2014 | Iwase | .................... A61B 3/102 |
| | | | | 351/206 |

(Continued)

FOREIGN PATENT DOCUMENTS

| | | |
|---|---|---|
| CN | 107657612 A | 2/2018 |
| JP | 2015-202236 A | 11/2015 |

OTHER PUBLICATIONS

Chinese Office Action for Chinese Application No. 201980025075.6 dated Feb. 1, 2024 (15 pages).

*Primary Examiner* — John Villecco
*Assistant Examiner* — Han Hoang
(74) *Attorney, Agent, or Firm* — Foley & Lardner LLP

(57) ABSTRACT

An image processing method is provided. The image processing method includes: setting a first analysis point and a second analysis point on a fundus image so as to be symmetrical about a reference line; finding a first blood vessel running direction at the first analysis point and finding a second blood vessel running direction at the second analysis point; and comparing the first blood vessel running direction against the second blood vessel running direction.

15 Claims, 12 Drawing Sheets

(56) References Cited

U.S. PATENT DOCUMENTS

| | | | |
|---|---|---|---|
| 2014/0204342 A1* | 7/2014 | Higuchi | A61B 3/14 |
| | | | 351/208 |
| 2015/0104087 A1* | 4/2015 | Katuwal | G06T 7/11 |
| | | | 382/128 |
| 2017/0112377 A1* | 4/2017 | Shiba | G06T 7/11 |
| 2018/0028056 A1* | 2/2018 | Kubota | G06T 7/12 |
| 2021/0038077 A1* | 2/2021 | Nishida | A61B 3/1225 |

* cited by examiner

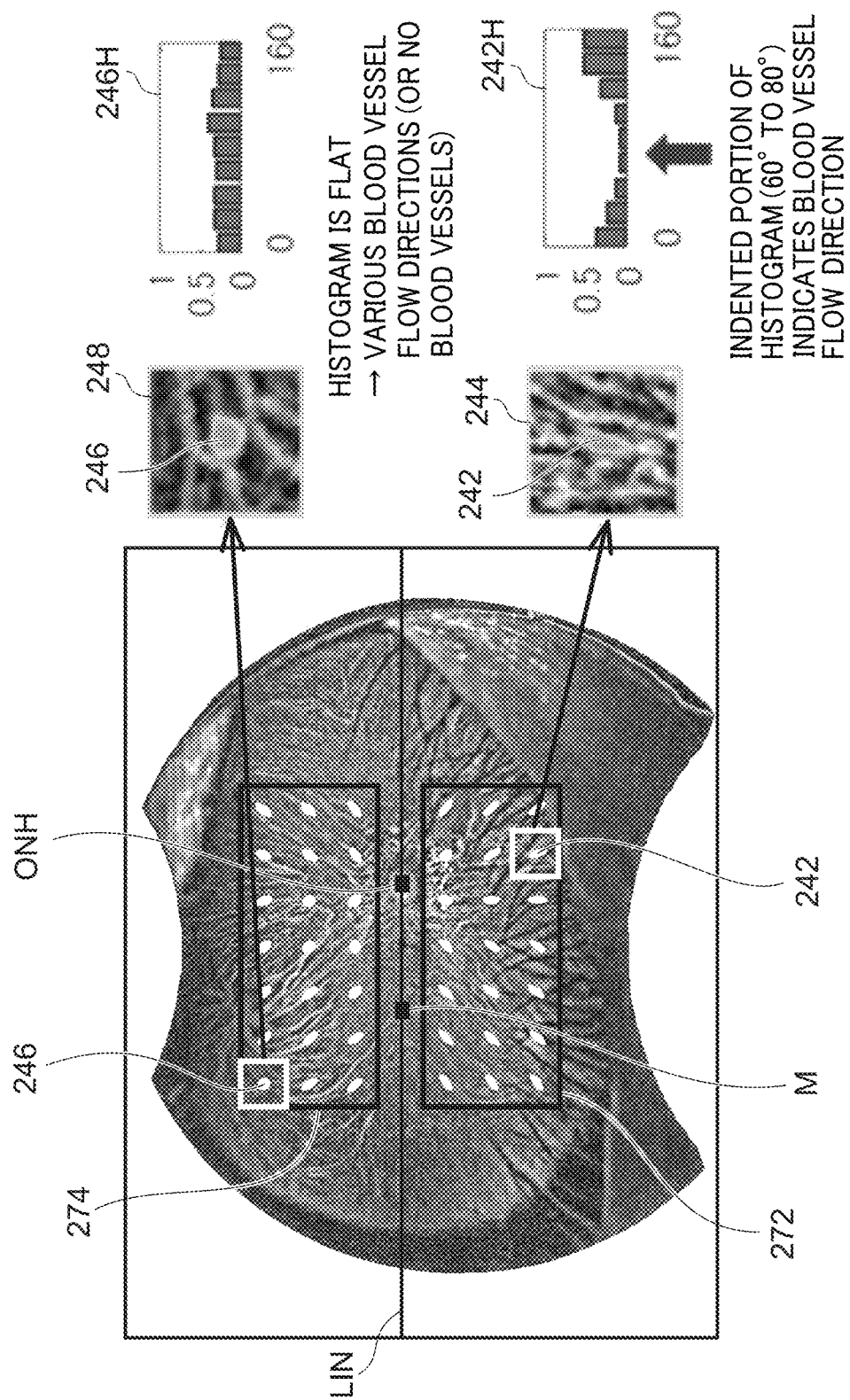

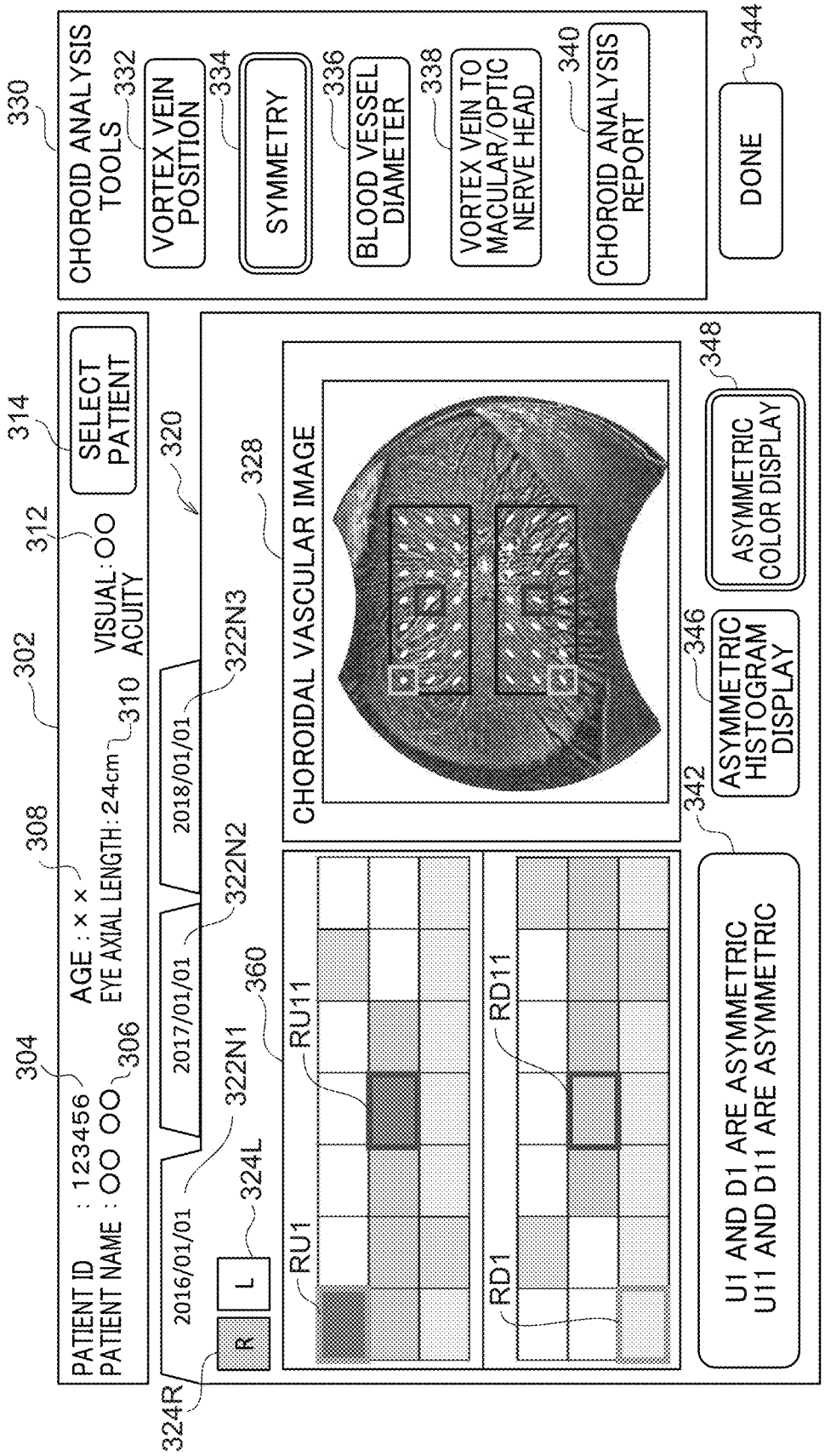

IMAGE PROCESSING METHOD, PROGRAM, IMAGE PROCESSING DEVICE, AND OPHTHALMIC SYSTEM

CROSS-REFERENCE TO RELATED APPLICATIONS

This application is a continuation application of International Application No. PCT/JP2019/016651 filed Apr. 18, 2019, the disclosure of which is incorporated herein by reference in its entirety. Further, this application claims priority from Japanese Patent Application No. 2018-080272, filed Apr. 18, 2018, the disclosure of which is incorporated herein by reference in their entirety.

TECHNICAL FIELD

Technology disclosed herein relates to an image processing method, a program, an image processing device, and an ophthalmic system.

RELATED ART

Technology is disclosed in Japanese Patent Application Laid-Open (JP-A) No. 2015-202236 for extracting blood vessel regions and measuring blood vessel diameters. There has hitherto been demand to analyze fundus images and to measure blood vessel diameters.

SUMMARY

An image processing method of a first aspect of technology disclosed herein includes setting a first analysis point and a second analysis point on a fundus image so as to be symmetrical about a reference line, finding a first blood vessel running direction at the first analysis point and finding a second blood vessel running direction at the second analysis point, and analyzing asymmetry between the first blood vessel running direction and the second blood vessel running direction.

An image processing method of a second aspect of technology disclosed herein includes setting plural first analysis points in a first region in a fundus image and setting plural second analysis points in a second region in the fundus image, finding a first blood vessel running direction for each of the plural first analysis points, and finding a second blood vessel running direction for each of the plural second analysis points, and defining plural pairs of a first analysis point and a second analysis point that have line symmetry between the plural first analysis points and the plural second analysis points, and finding a symmetry indicator indicating symmetry between the first blood vessel running direction and the second blood vessel running direction for each of the plural defined pairs.

A program of a third aspect of technology disclosed herein causes the image processing method of the first aspect or the second aspect to be executed by a computer.

An image processing device of a fourth aspect of technology disclosed herein includes a storage device configured to store a program causing an image processing method to be executed in a processing device, and a processing device configured to execute the image processing method by executing the program stored in the storage device, wherein the image processing method is the image processing method of the first aspect or the second aspect.

An ophthalmic system of a fifth aspect of technology disclosed herein includes the image processing device of the fourth aspect, and an ophthalmic device configured to image a fundus image.

BRIEF DESCRIPTION OF DRAWINGS

FIG. 9 is a diagram illustrating histograms of gradient direction at analysis points 242, 246 arranged so as to be have line symmetry with reference to a straight line LIN in a choroidal vascular image that has been rotated such that the straight line LIN joining a macular M and an optic nerve head together is horizontal.

FIG. 14 is a display screen displayed when an asymmetry color display icon 348 has been clicked on the display screen of FIG. 12.

DETAILED DESCRIPTION

Detailed explanation follows regarding an exemplary embodiment in the present invention, with reference to the drawings. In the following, for ease of explanation, a scanning laser ophthalmoscope is referred to as an "SLO".

Figure 1:
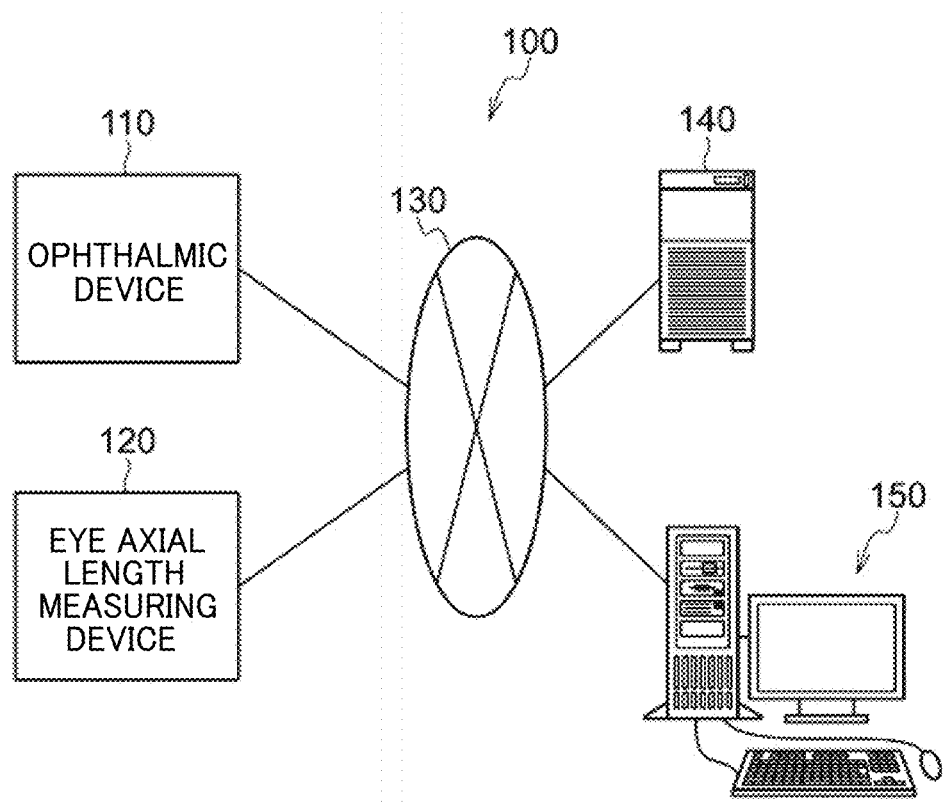
FIG. 1 is a block diagram illustrating an ophthalmic system 100.

The configuration of an ophthalmic system 100 will now be described with reference to FIG. 1. As illustrated in FIG. 1, the ophthalmic system 100 includes an ophthalmic device 110, an eye axial length measuring instrument 120, a management server device (hereinafter referred to as "management server") 140, and an image display device (hereinafter referred to as "image viewer") 150. The ophthalmic device 110 acquires fundus images. The eye axial length measuring instrument 120 measures the axial length of patient eyes. The management server 140 stores plural fundus images and eye axial lengths obtained by imaging the fundi of plural patients using the ophthalmic device 110, stored associated with respective patient IDs.

The ophthalmic device 110, the eye axial length measuring instrument 120, the management server 140, and the image viewer 150 are connected to each other over a network 130.

Note that other ophthalmic instruments (instruments for performing examinations such as optical coherence tomography (OCT) measurement, field of view measurement, and intraocular pressure measurement) and a diagnostic support device that performs image analysis using artificial intelligence may be connected over the network 130 to the ophthalmic device 110, the eye axial length measuring instrument 120, the management server 140, and the image viewer 150.

Figure 2:
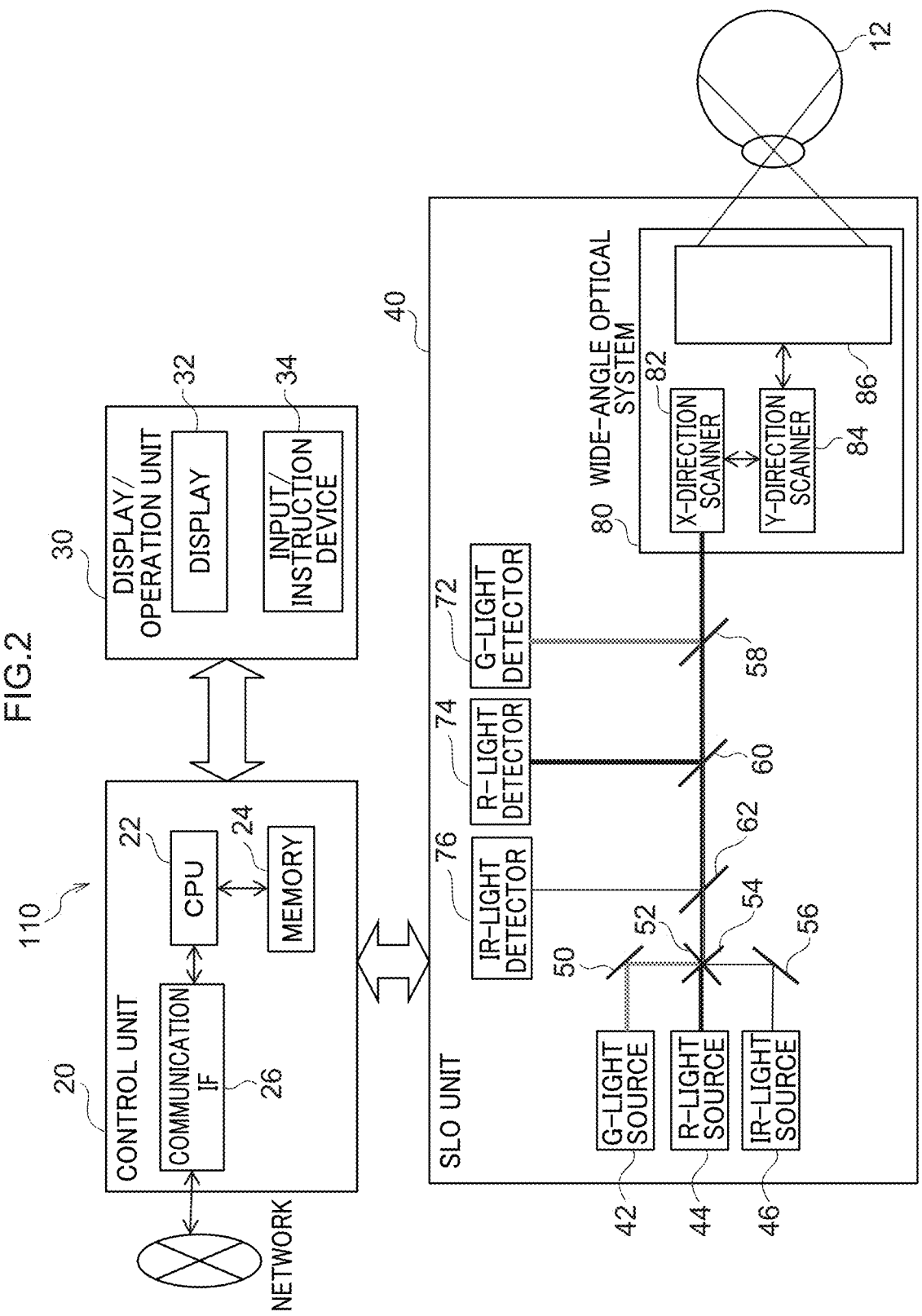
FIG. 2 is a schematic configuration diagram illustrating an overall configuration of an ophthalmic device 110.

Explanation follows regarding a configuration of the ophthalmic device 110, with reference to FIG. 2. As illustrated in FIG. 2, the ophthalmic device 110 includes a control unit 20, a display/operation unit 30, and an SLO unit 40, and images the posterior segment (fundus) of the examined eye 12. Furthermore, a non-illustrated OCT unit may be provided for acquiring OCT data of the fundus.

The control unit 20 includes a CPU 22, memory 24, a communication interface (I/F) 26, and the like. The display/operation unit 30 is a graphical user interface to display images obtained by imaging, and to receive various instructions including an imaging instruction. The display/operation unit 30 also includes a display 32 and an input/instruction device 34 such as a touch panel.

The SLO unit 40 includes a light source 42 for green light (G-light: wavelength 530 nm), a light source 44 for red light (R-light: wavelength 650 nm), and a light source 46 for infrared radiation (IR-light (near-infrared light): wavelength 800 nm). The light sources 42, 44, 46 respectively emit light as commanded by the control unit 20. The SLO unit 40 includes optical systems 50, 52, 54 and 56 that reflect or transmit light from the light sources 42, 44 and 46 in order to guide the reflected light into a single optical path. The optical systems 50 and 56 are mirrors, and the optical systems 52 and 54 are beam splitters. The G-light is reflected by the optical systems 50 and 54, the R-light is transmitted through the optical systems 52 and 54, and the IR-light is reflected by the optical systems 52 and 56, such that all are guided into a single optical path.

The SLO unit 40 includes a wide-angle optical system 80 for two-dimensionally scanning light from the light sources 42, 44, 46 across the posterior segment (fundus) of the examined eye 12. The SLO unit 40 includes a beam splitter 58 that, from out of the light from the posterior segment (fundus) of the examined eye 12, reflects the G-light and transmits light other than the G-light. The SLO unit 40 includes a beam splitter 60 that, from out of the light transmitted through the beam splitter 58, reflects the R-light and transmits light other than the R-light. The SLO unit 40 includes a beam splitter 62 that, from out of the light that has transmitted through the beam splitter 60, reflects IR-light. The SLO unit 40 is provided with a G-light detection element 72 that detects the G-light reflected by the beam splitter 58, an R-light detection element 74 that detects the R-light reflected by the beam splitter 60, and an IR-light detection element 76 that detects IR-light reflected by the beam splitter 62.

The wide-angle optical system 80 includes an X-direction scanning device 82 configured by a polygon mirror to scan the light from the light sources 42, 44, 46 in an X direction, a Y-direction scanning device 84 configured by a galvanometer mirror to scan the light from the light sources 42, 44, 46 in a Y direction, and an optical system 86 including a non-illustrated slit mirror and elliptical mirror to widen the angle over which the light is scanned. The optical system 86 is capable of achieving a field of view (FOV) of the fundus of a fundus peripheral portion ultra-wide angle (ultra wide field), enabling a fundus region to be imaged over a wide range. More specifically, a fundus region can be imaged over a wide range of approximately 120 degrees of external light illumination angles from outside the examined eye 12 (approximately 200 degrees about an eyeball center O of the examined eye 12 as a reference position for an internal light illumination angle capable of being imaged in practice by illuminating the fundus of the examined eye 12 with scanning light). The optical system 86 may be configured employing plural lens sets instead of a slit mirror and elliptical mirror. The X-direction scanning device 82 and the Y-direction scanning device 84 may each also be a scanning device employing a two-dimensional scanner configured by MEMS mirrors.

A configuration may employ a system using an elliptical mirror as described in International Applications PCT/JP2014/084619 or PCT/JP2014/084630 in cases in which a system including a slit mirror and an elliptical mirror is used as the optical system 86. The respective disclosures of International Application PCT/JP2014/084619 (International Publication WO2016/103484) filed on Dec. 26, 2014 and International Application PCT/JP2014/084630 (International Publication WO2016/103489) filed on Dec. 26, 2014 are incorporated by reference herein in their entireties.

Note that when the ophthalmic device 110 is installed on a horizontal plane, the "X direction" corresponds to a horizontal direction and the "Y direction" corresponds to a direction perpendicular to the horizontal plane. A direction joining the center of the pupil of the anterior eye portion of the examined eye 12 and the center of the eyeball is referred to as the "Z direction". The X direction, the Y direction, and the Z direction are accordingly perpendicular to one another.

A color fundus image is obtained by imaging the fundus of the examined eye 12 simultaneously with G-light and R-light. More specifically, the control unit 20 controls the light sources 42, 44 such that the light sources 42, 44 emit light at the same time, and scans the G-light and R-light across the fundus of the examined eye 12 using the wide-angle optical system 80. G-light reflected from the fundus of the examined eye 12 is detected by the G-light detection element 72, and image data of a second fundus image (a G fundus image) is generated by the CPU 22 of the ophthalmic device 110. Similarly, R-light reflected from the fundus of the examined eye 12 is detected by the R-light detection element 74, and image data of a first fundus image (R fundus image) is generated by the CPU 22 of the ophthalmic device 110. In cases in which IR-light is illuminated, IR-light reflected from the fundus of the examined eye 12 is detected by the IR-light detection element 76, and image data of an IR fundus image is generated by the CPU 22 of the ophthalmic device 110.

The structure of the eye is configured by the vitreous body covered by plural layers that each have a different structure. These plural layers include the retina, the choroid, and the sclera in sequence from the side closest to the vitreous body outward. R-light passes through the retina and travels as far as the choroid. Accordingly, the first fundus image (R fundus image) includes information relating to blood vessels present in the retina (retinal blood vessels) and information relating to blood vessels present in the choroid (choroidal blood vessels). By contrast, G-light only travels as far as the retina. Accordingly, the second fundus image (G fundus image) includes information relating to the blood vessels (retinal blood vessels) present in the retina.

The CPU 22 of the ophthalmic device 110 mixes the first fundus image (R fundus image) and the second fundus image (G fundus image) together at a specific ratio, and displays the resulting color fundus image on the display 32. Note that a configuration may be adopted in which instead of the color fundus image, the first fundus image (R fundus image), the second fundus image (G fundus image), or an IR fundus image is displayed.

Image data of the first fundus image (R fundus image), image data of the second fundus image (G fundus image), and image data of the IR fundus image is sent from the ophthalmic device 110 to the management server 140 through a communication IF 166, and stored in a memory 164, described later.

The fundus of the examined eye 12 is accordingly imaged by the G-light and R-light at the same time, and so each of the positions on the first fundus image (R fundus image) and the positions on the second fundus image (G fundus image) corresponding to these respective positions, are the same positions on the fundus.

The eye axial length measuring instrument 120 in FIG. 1 has two modes for measuring the eye axial length, this being the length of the examined eye 12 in an eye axial direction (Z direction), namely a first mode and a second mode. In the first mode, light from a non-illustrated light source is guided into the examined eye 12, and interference light generated from interference between reflected light from the fundus and reflected light from the cornea is received, and the eye axial length is measured based on an interference signal represented by the interference light received. The second mode is a mode in which non-illustrated ultrasound waves are employed to measure the eye axial length. The eye axial length measuring instrument 120 transmits the eye axial length measured using either the first mode or the second mode to the management server 140. The eye axial length may be measured using both the first mode and the second mode, in which case an average of the eye axial lengths measured by the two modes is transmitted to the management server 140 as the eye axial length.

As one item of data about a patient, the eye axial length is saved in the memory 164 as patient information in the management server 140, and is also utilized in fundus image analysis.

Figure 3:
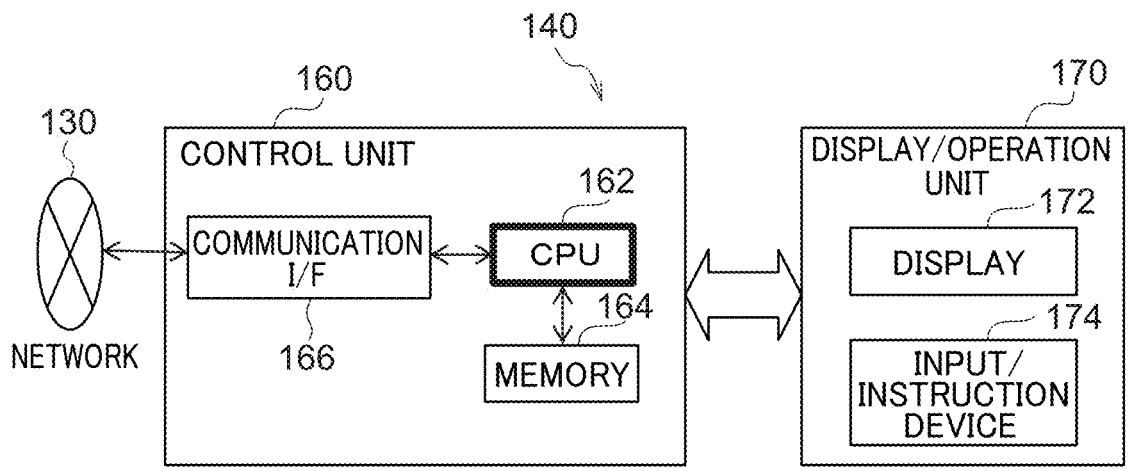
FIG. 3 is a block diagram of a configuration of an electrical system of a management server 140.

Next, a configuration of the management server 140 will be described with reference to FIG. 3. As illustrated in FIG. 3, the management server 140 includes a control unit 160, and a display/operation unit 170. The control unit 160 is equipped with a computer including a CPU 162, memory 164 configured by a storage device, a communication interface (I/F) 166, and the like. Note that an image processing program is stored in the memory 164. The display/operation unit 170 is a graphical user interface for displaying images and for receiving various instructions. The display/operation unit 170 includes a display 172 and an input/instruction device 174 such as a touch panel. The management server 140 is an example of an "image processing device" of technology disclosed herein.

The configuration of the image viewer 150 is similar to that of the management server 140, and so description thereof is omitted.

Figure 4:
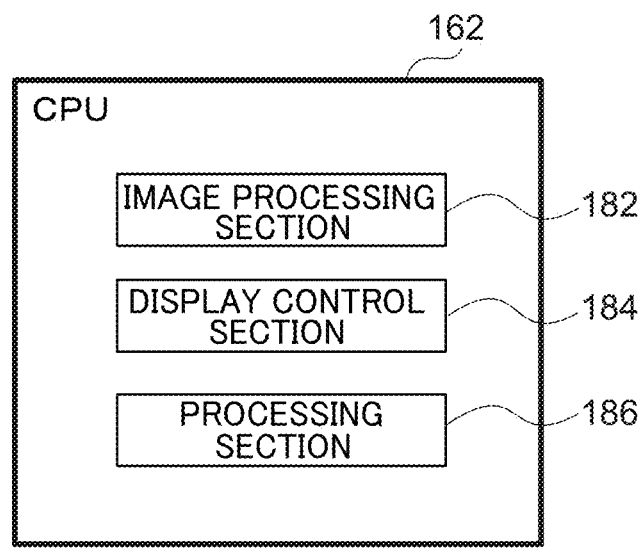
FIG. 4 is a block diagram illustrating functions of a CPU 162 of a management server 140.

Next, with reference to FIG. 4, description follows regarding each of various functions implemented by the CPU 162 of the management server 140 executing the image processing program. The image processing program includes an image processing function, a display control function, and a processing function. By the CPU 162 executing the image processing program including each of these functions, the CPU 162 functions as an image processing section 182, a display control section 184, and a processing section 186, as illustrated in FIG. 4.

Figure 5:
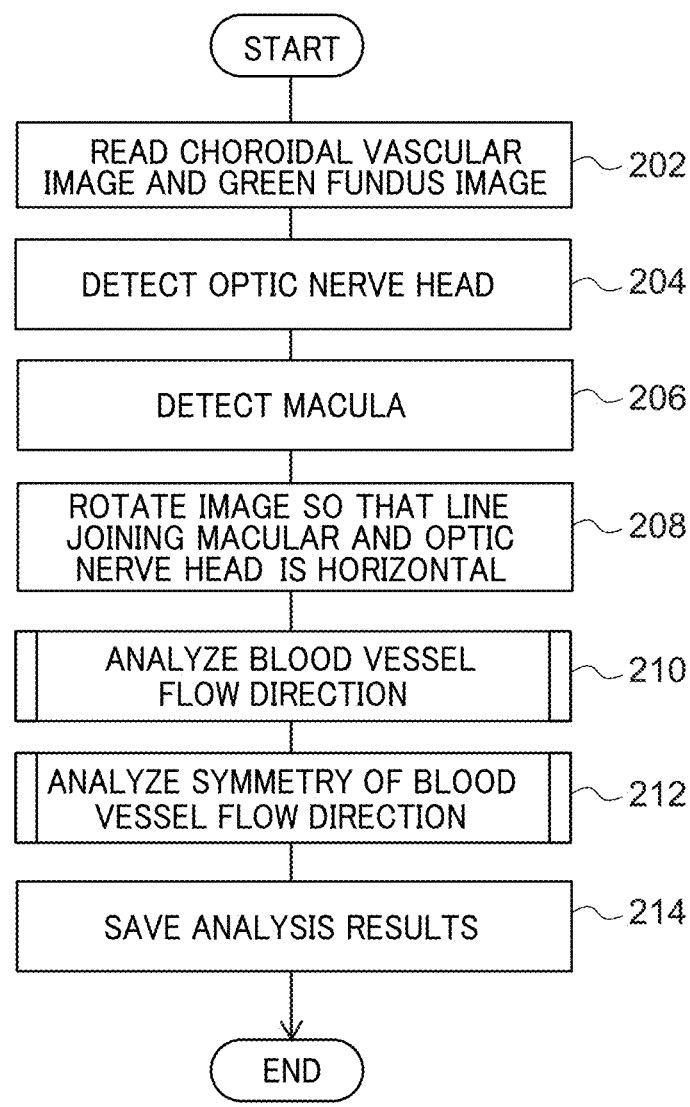
FIG. 5 is flowchart of an image processing program.

Next, with reference to FIG. 5, detailed description follows regarding image processing by the management server 140. The image processing illustrated in the flowchart of FIG. 5 is implemented by the CPU 162 of the management server 140 executing the image processing program.

The image processing program is executed by the management server 140 when generating a choroidal vascular image based on the image data of the fundus images imaged by the ophthalmic device 110.

Figure 8A:
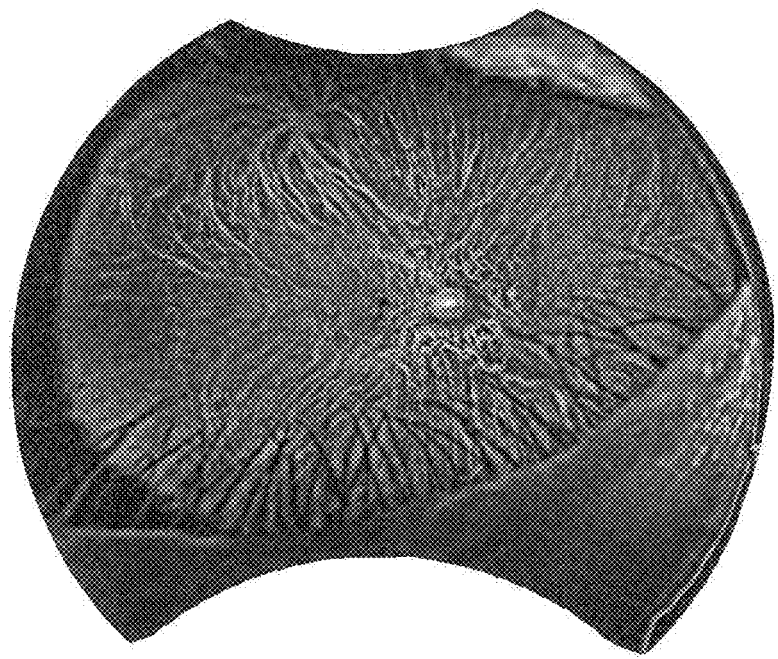
FIG. 8A is a diagram illustrating a choroidal vascular image.

A choroidal vascular image is generated in the following manner. The image processing section 182 of the management server 140 subjects the second fundus image (G fundus image) to black hat filter processing so as to extract the retinal blood vessels from the second fundus image (G fundus image). Next, the image processing section 182 removes the retinal blood vessels from the first fundus image (R fundus image) by performing in-painting processing employing the retinal blood vessels extracted from the second fundus image (G fundus image). Namely, processing is performed that uses position information relating to the retinal blood vessels extracted from the second fundus image (G fundus image) to infill the retinal blood vessel structure in the first fundus image (R fundus image) with the same values to those of surrounding pixels. The image processing section 182 then subjects the image data of the first fundus image (R fundus image) from which the retinal blood vessels have been removed to contrast-limited adaptive histogram equalization, thereby emphasizing the choroidal blood vessels in the first fundus image (R fundus image). A choroidal vascular image as illustrated in FIG. 8A is obtained thereby. The generated choroidal vascular image is stored in the memory 164. The choroidal vascular image is an example of a "fundus image" of technology disclosed herein.

Moreover, although the choroidal vascular image is generated from the first fundus image (R fundus image) and the second fundus image (G fundus image), and the image processing section 182 may next generate a choroidal vascular image employing the first fundus image (R fundus image) or the IR fundus image imaged with IR light. Regarding the method used to generate the choroidal fundus image, the disclosure of Japanese Patent Application No. 2018-052246, filed on Mar. 20, 2018, is incorporated in its entirety by reference herein.

When the image processing program is started, at step 202 of FIG. 5, the processing section 186 reads the choroidal vascular image (see FIG. 8A) and the G fundus image from the memory 164. The macular and the optic nerve head are imaged clearly in the G fundus image, and the macular and the optic nerve head are more easily discerned by image processing therein than in the choroidal vascular image. The G fundus image is accordingly employed to detect the positions of the macular and optic nerve head as described below.

At step 204, the image processing section 182 detects the optic nerve head ONH (see also FIG. 9) in the G fundus image. Green (G) laser light is reflected at the retinal layer, and so the G fundus image imaged with G laser light may be employed to extract the structure of the retina. Since the optic nerve head ONH is the brightest region in the G fundus image, the image processing section 182 detects a region of a specific number of pixels with the highest pixel values in the G fundus image read as described above as the optic nerve head (ONH). The position at the center of the region containing the brightest pixels is computed as coordinates of the position of the optic nerve head (ONH) and stored in the memory 164.

At step 206, the image processing section 182 detects the macular M (see also FIG. 9) from the G fundus image. Specifically, the macular is a dark region in the choroidal vascular image, and so the image processing section 182 detects a region of a specific number of pixels having the lowest pixel values in the choroidal vascular image read as described above as the macular M. The coordinates of the position at the center of the region containing the darkest pixels is computed as coordinates of the position of the macular M and stored in the memory 164.

Figure 8B:
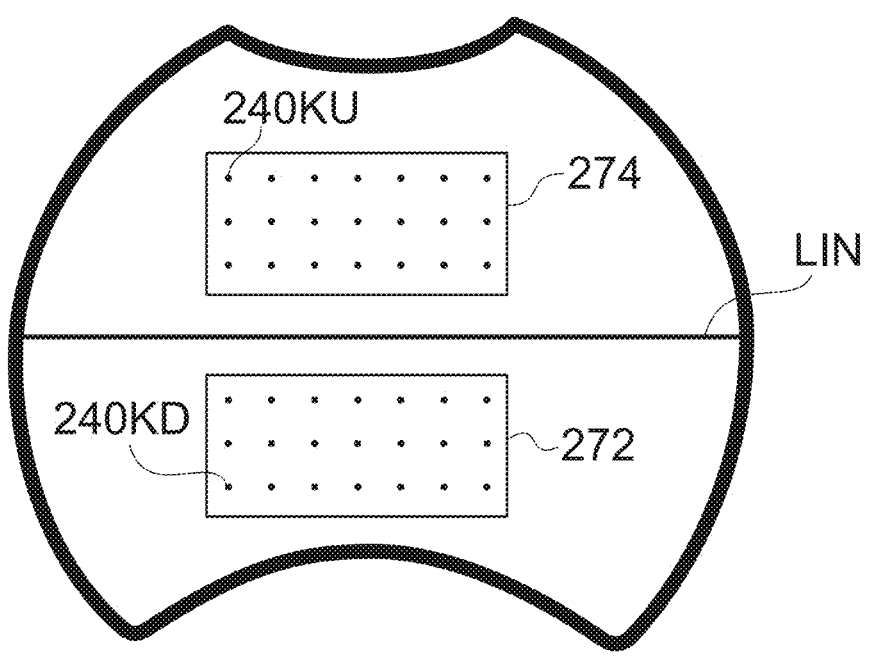
FIG. 8B is a diagram illustrating plural analysis points set on a choroidal vascular image.

At step 208, the image processing section 182 reads the coordinates of the macular M and the coordinates of the optic nerve head ONH computed from the G fundus image as illustrated in FIG. 8B and FIG. 9. The image processing section 182 sets the read respective coordinates on the choroidal vascular image, and sets a straight line LIN connecting the macular M and the optic nerve head ONH on the choroidal vascular image. Since the choroidal vascular image is generated from the G fundus image and the R fundus image, the coordinates of the macular M and the coordinates of the optic nerve head ONH detected with the G fundus image also match the position of the macular M and the position of the optic nerve head ONH on the choroidal vascular image. The image processing section 182 rotates the choroidal vascular image such that the straight line LIN is horizontal.

At step 210, the image processing section 182 analyzes the blood vessel running directions of the choroidal blood vessels, at step 212 the image processing section 182 analyzes the symmetry of the blood vessel running directions of the choroidal blood vessel, and at step 214 the image processing section 182 saves the analysis results in the memory 164.

The processing of steps 210 and 212 is described in detail later.

Figure 6:
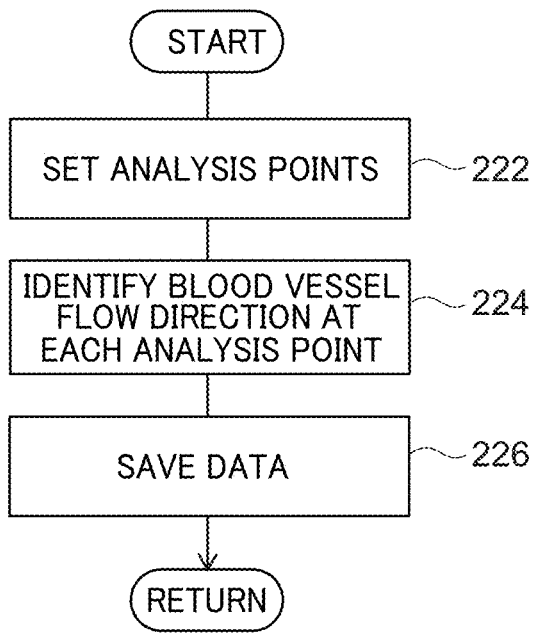
FIG. 6 is a flowchart of a blood vessel running direction analysis processing program of step 210 of FIG. 5.

The blood vessel running direction analysis processing of step 210 will next be described, with reference to FIG. 6, FIG. 8B, and FIG. 9. At step 222 of FIG. 6, the image processing section 182 sets the analysis points in the following manner.

As illustrated in FIG. 8B, a first region 274 and a second region 272 in the choroidal vascular image are set by the straight line LIN. Specifically, the first region is positions above the straight line LIN, and the second region is positions below the straight line LIN.

The image processing section 182 arranges analysis points 240KU in the first region 274 so as to be positioned in a grid pattern with uniform spacings and M (natural number) rows in the up-down direction, and N (natural number) columns in the left-right (horizontal) direction. In FIG. 8B, the number of analysis points in the first region 264 is M (3)×N (7) (=L: 21). Note that the choroidal vascular image is displayed according to a conformal projection with the analysis points positioned in a grid pattern, however, if the choroidal vascular image is displayed using another projection then the image processing section 182 arranges the analysis points in a pattern to match that projection.

The image processing section 182 arranges analysis points 240KD in the second region 272 at positions having line symmetry with reference to the straight line LIN to the analysis points 240KU arranged in the first region 274.

Note that there is no limitation to positioning in a grid pattern of uniform spacing as long as the analysis points 240KU, 240KD are positioned in the first region 274 and the second region 272 at positions having line symmetry with reference to the straight line LIN, and configurations without a uniform spacing, or without a grid pattern, may also be adopted.

The size of the first region 274 and the second region 272 may be changed according to the eye axial length. L, M, and N may also be set to various values without limitation to those of the example described above. Increasing the number thereof increases the resolution.

At step 224, the image processing section 182 computes the blood vessel running direction of the choroidal blood vessels at each of the analysis points. Specifically, the image processing section 182 repeats the processing described below for all the analysis points. Namely, as illustrated in FIG. 9, for a central pixel corresponding to an analysis point 242, the image processing section 182 sets a region (cell) 244 configured by plural pixels surrounding this central pixel at the center.

The region 244 is illustrated in FIG. 8B and FIG. 9 after top-bottom inversion. This is done to facilitate comparison with a region 248 containing an analysis point 246 at the upper side of the pair.

The image processing section 182 then calculates the brightness gradient direction for each of the pixels in the cell 244 (expressed as an angle from 0° up to but not including 180°, with 0° defined as the direction of the straight line LIN (horizontal line)) based on the brightness values of the pixels surrounding the pixel being calculated. The gradient direction calculation is performed for all of the pixels in the cell 244.

Next, in order to create a histogram 242H with nine bins (each bin width being 20°) of gradient directions 0°, 20°, 40°, 60°, 80°, 100°, 120°, 140°, and 160° with reference to an angle reference line, the image processing section 182 counts the number of pixels inside the cell 244 with a gradient direction corresponding to each of the bins. The angle reference line is the straight line LIN. The width of a single bin in the histogram is 20°, and the number (count value) of pixels in the cell 244 having a gradient direction of from 0° up to but not including 10°, or a gradient direction of from 170° up to but not including 180° is set for the 0° bin. The number (count value) of pixels in the cell 244 having a gradient direction of from 10° up to but not including 30° is set for the 20° bin. The count values for the bins 40°, 60°, 80°, 100°, 120°, 140°, and 160° are set in a similar manner. Due to there being nine bins in the histogram 242, the blood vessel running direction at the analysis point 242 is defined as being in one of nine direction types. Note that the resolution of the blood vessel running direction can be raised by narrowing the width of each bin and increasing the number of bins.

The count values of each of the bins (the vertical axis in the histogram 242H) is normalized, and the histogram 242H is created for the analysis point 242 illustrated in FIG. 9.

Next, the image processing section 182 identifies the blood vessel running direction at each analysis point from the histogram 242H. Specifically, the bin with the angle having the smallest count value, the 60° bin in the example illustrated in FIG. 9, is identified, and 60°, which is the gradient direction of the identified bin, is identified as the blood vessel running direction of the analysis point 242. The gradient direction having the smallest count is taken as the blood vessel running direction for the following reason. There is a small brightness gradient along the blood vessel running direction, however, there is a larger brightness gradient in other directions (for example, there is a large difference in brightness between blood vessels and tissue other than blood vessel). Thus when histograms of brightness gradient are created for each of the pixels, then the count value is small for the bin along the blood vessel running direction.

A histogram 246H is similarly created for a cell 248 set for the analysis point 246. The 160° bin is identified as the bin having the smallest count from out of the bins of histogram 246H. The blood vessel running direction of the analysis point 246 is accordingly identified as 160°.

The histogram 242H and the histogram 246H are examples of a "first histogram" and a "second histogram" of the technology disclosed herein.

Figure 10:
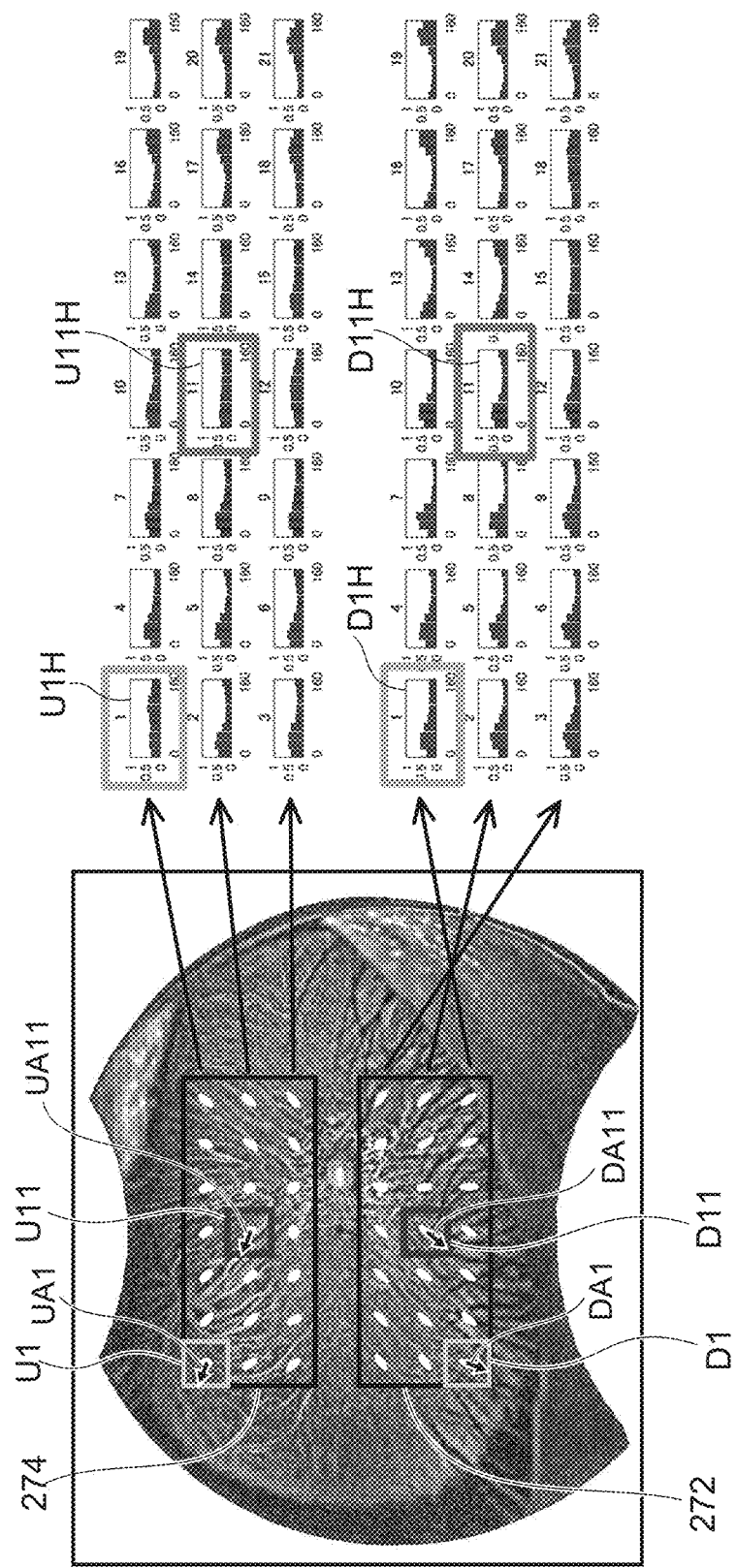
FIG. 10 is a diagram illustrating positional relationships between a straight line LIN, each analysis point, and each histogram.

By performing the processing described above for all of the analysis points in both the first region and the second region, the blood vessel running directions are identified for each of the analysis points set in the choroidal vascular image. Namely, histograms are derived for each of the analysis points, as illustrated in FIG. 10. In FIG. 10, the arrangement of the histogram display is changed in the second region below the straight line LIN. The histogram corresponding to an analysis point U1 in FIG. 10 is a histogram U1H, and the histogram corresponding to comparison target analysis point D1 is a histogram D1H. The arrangements of histograms in the first region and the second region accordingly match (the histograms in the second region are arranged in the same sequence as those in the first region).

At step 226, the image processing section 182 saves the following data. Namely, the image processing section 182 saves in the memory 164 the position of the macular M, the position of the optic nerve head ONH, the rotation angle for rotating the choroidal vascular image through to make the straight line LIN horizontal, the positions (XY coordinates) of each of the analysis points (L analysis points), pairing information between analysis points that have line symmetry with reference to the straight line LIN (pairs of numbers of respective analysis points in the first and second regions), the blood vessel running direction at each of the analysis points, and the histogram at each of the analysis points.

Figure 7:
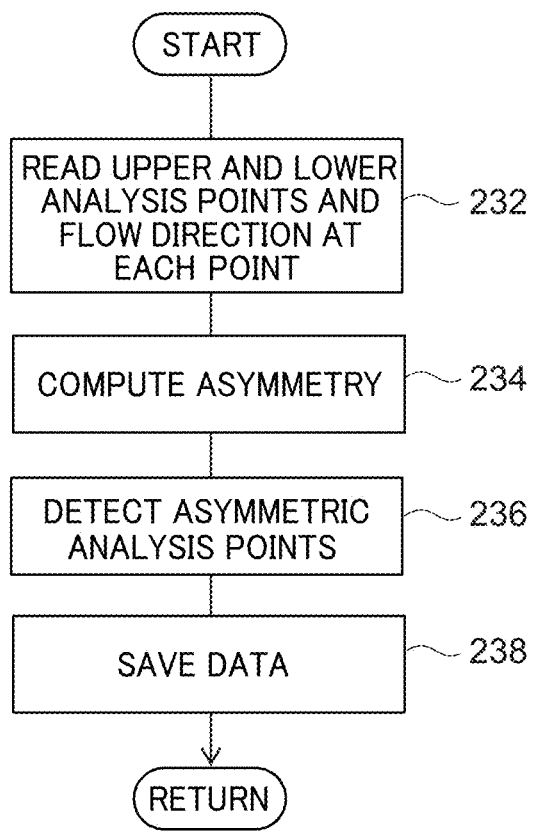
FIG. 7 is a flowchart of a blood vessel running direction symmetry analysis processing program of step 212 in FIG. 5.

Next, with reference to FIG. 7, description follows regarding the blood vessel running direction symmetry analysis processing of step 212 of FIG. 5. At step 232 of FIG. 7, the image processing section 182 reads respective analysis points in upper and lower (in the first and second regions) and reads the blood vessel running direction at each of the points. Specifically, the image processing section 182 reads the analysis points and the blood vessel running direction at each of these points for each pair of analysis points having line symmetry with reference to the straight line LIN.

At step 234, the image processing section 182 computes an asymmetric indicator value for pairs of analysis points having line symmetry with reference to the straight line LIN. The asymmetric indicator value is a difference in blood vessel running directions, and this difference is found from the histograms at each of the analysis points of the respective pair. A difference $\Delta h$ in counts between each respective degree number bin in a given histogram pairs is found, and then $\Delta h$ squared. Then the sum of $\Delta h^2$ for all the bins is found by calculating $\Sigma \Delta h^2$. The larger the value of $\Sigma \Delta h^2$, the greater the difference in shape between the histograms, and the larger the asymmetry therebetween, and the smaller the value thereof, the closer the shapes of the histograms are, and the smaller the asymmetry.

The histograms at each of the analysis points in the respective pairs are examples of a "first blood vessel running direction" and a "second blood vessel running direction" of the technology disclosed herein.

Note that the asymmetric indicator value is not limited to such a sum of squared differences between the histograms of the analysis points in the respective pairs. A representative angle may be determined from the histograms at the analysis points in the respective pairs, and an absolute value difference computed therefrom.

At step 236, the image processing section 182 detects pairs of asymmetric analysis points. Specifically, the image processing section 182 detects any pairs for which the asymmetric indicator value for the pair is a threshold or greater as such being asymmetric analysis points. The threshold is a fixed value set in advance, or is an overall average value of the asymmetric indicator values for the pairs.

FIG. 10 is a diagram illustrating analysis results of step 236. The analysis point U1 in the first region (upper region 274) and the analysis point D1 in the second region (lower region 272) are a pair having a line symmetry relationship, and similarly, the analysis point U11 and the analysis point D11 are also a pair having a line symmetry relationship. The results of analysis at step 234 is that these pairs are determined to have asymmetric indicator values of the threshold or greater, and are accordingly identified as being pairs of asymmetric analysis points. The arrow UA1 is an arrow indicating the blood vessel running direction at analysis point U1, a direction of 160°. Similarly, the arrow DA1 is an arrow indicating the blood vessel running direction at analysis point D1, a direction of 60°. The arrow UA11 is an arrow indicating the blood vessel running direction at analysis point U11, a direction of 160°. Similarly, the arrow DA11 is an arrow indicating the blood vessel running direction at analysis point D11, a direction of 40°.

At step 238, the image processing section 182 saves the following data in the memory 164. Namely, for each of the pairs, the image processing section 182 saves in the memory 164 the asymmetric indicator values, a flag indicating whether or not the asymmetric indicator value is the threshold or greater (asymmetric or not), and the angle of the blood vessel running directions at the analysis points of the respective pairs.

Next description follows regarding a display screen in a choroidal vascular analysis mode. The memory 164 of the management server 140 holds data to create a display screen for the following choroidal vascular analysis mode, or contents data for display on this display screen.

This is specifically the following data. Image data for the fundus images (the first fundus image (R fundus image) and the second fundus image (G fundus image)) is transmitted from the ophthalmic device 110 to the management server 140, and the management server 140 holds the image data for the fundus images (the first fundus image (R fundus image) and the second fundus image (G fundus image)). The management server 140 also holds the image data of the choroidal vascular image (see FIG. 8A). The management server 140 holds the position of the macular M, the position of the optic nerve head ONH, the rotation angle through which to rotate the choroidal vascular image so as to make the straight line LIN horizontal, the positions of each of the (L) analysis points, pairings of analysis points that have line symmetry with reference to the straight line LIN, and the histogram and angles indicating the blood vessel running direction that are feature values at each of the analysis points. The management server 140 also holds the asymmetric indicator value for each analysis point pair and a flag of whether or not the asymmetric indicator value is the threshold or greater (asymmetric or not).

Moreover, personal information about a patient is also input to the ophthalmic device 110 when the fundus of the patient is being imaged. The personal information includes an ID, name, age, visual acuity, and the like of the patient. Moreover, information indicating whether the eye whose fundus is imaged is either the right eye or the left eye is also input when the fundus of the patient is being imaged. Furthermore, the imaging date/time is also input when the fundus of the patient is being imaged. Data for the personal information, right eye/left eye information, and imaging date/time is transmitted from the ophthalmic device 110 to the management server 140. The management server 140 holds the data for the personal information, right eye/left eye information, and imaging date/time. The management server 140 also holds data for the eye axial length.

Thus as described above, the management server 140 holds data for creating the display screen for the above choroidal vascular analysis mode.

When diagnosing a patient, the ophthalmologist performs the diagnosis while looking at the display screen of the choroidal vascular analysis mode being displayed on the image viewer 150. When this is being performed, the ophthalmologist uses the image viewer 150 to transmit a demand to display the choroidal vascular analysis mode screen to the management server 140 using a non-illustrated menu screen. On receipt of this demand, the display control section 184 of the management server 140 uses the contents data for the specified patient ID to create the choroidal vascular analysis mode display screen, and the processing section 186 transmits the image data for the display screen to the image viewer 150.

Note that the processing section 186 is an example of an "output section" of technology disclosed herein.

Figure 11:
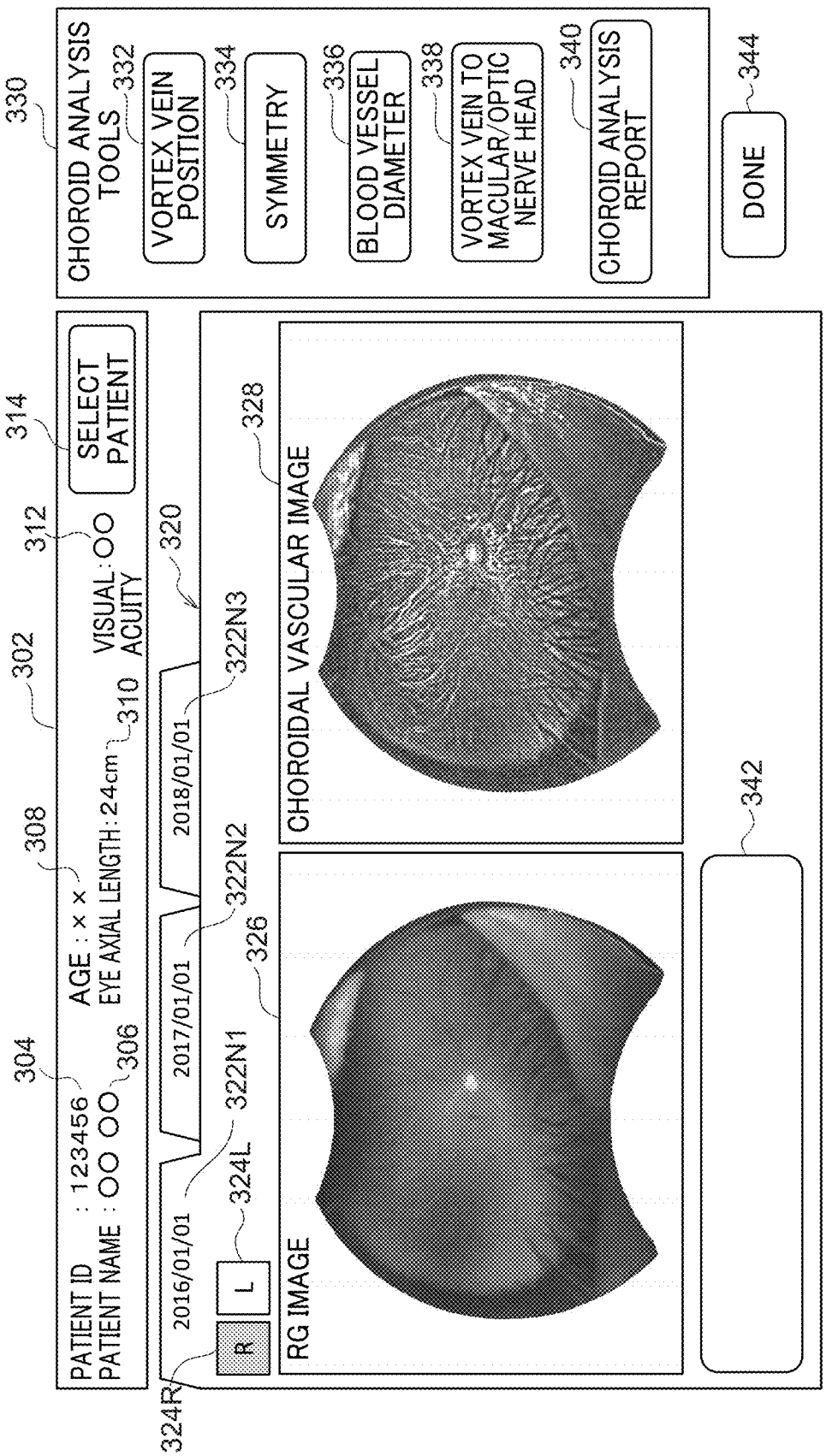
FIG. 11 is a diagram illustrating a display screen 300 in a choroidal vascular analysis mode.

On receipt of the data for the choroidal vascular analysis mode display screen, the image viewer 150 displays the choroidal vascular analysis mode display screen 300 illustrated in FIG. 11 on the display 172 based on the data for the choroidal vascular analysis mode display screen.

Explanation follows regarding the choroidal vascular analysis mode display screen 300 illustrated in FIG. 11. As illustrated in FIG. 11, the choroidal vascular analysis mode display screen 300 includes a personal information display field 302 for displaying personal information about a patient, an image display field 320, and a choroid analysis tool display field 330.

The personal information display field 302 includes a patient ID display field 304, a patient name display field 306, an age display field 308, an eye axial length display field 310, a visual acuity display field 312, and a patient selection icon 314. Various information is displayed in the patient ID display field 304, the patient name display field 306, the age display field 308, the eye axial length display field 310, and the visual acuity display field 312. Note that when the patient selection icon 314 is clicked, a list of patients is displayed on the display 172 of the image viewer 150, so as to let a user (ophthalmologist or the like) select the patient to be analyzed.

The image display field 320 includes imaging date display fields from 322N1 to 322N3, a right eye information display field 324R, a left eye information display field 324L, an RG image display field 326, a choroidal vascular image display field 328, and an information display field 342. Note that the RG image is an image obtained by combining the first fundus image (R fundus image) and the second fundus image (G fundus image) with the magnitudes of the respective pixel values combined at a specific ratio (for example, 1:1).

The choroid analysis tool display field 330 is a field displaying various icons to select plural choroid analysis tools. These include a vortex vein position icon 332, a symmetry icon 334, a blood vessel diameter icon 336, a vortex vein to macular/optic nerve head icon 338, and a choroid analysis report icon 340.

The vortex vein position icon 332 instructs display of vortex vein positions. The symmetry icon 334 instructs display of analysis point symmetry. The blood vessel diameter icon 336 instructs display of analysis results related to the diameters of the choroidal blood vessels. The vortex vein to macular/optic nerve head icon 338 instructs display of analysis results of analyzed positions between the vortex vein, and the macular and optic nerve head. The choroid analysis report icon 340 instructs display of a choroid analysis report.

Icons and buttons for instructing image generation, described later, are displayed on the display screen, also described later, of the image viewer 150. When the user of the image viewer 150 (an ophthalmologist or the like) clicks on one of the icons etc., an instruction signal corresponding to the clicked icon etc. is transmitted from the image viewer 150 to the management server 140. On receipt of the instruction signal from the image viewer 150, the management server 140 generates an image corresponding to the instruction signal, and transmits image data of the generated image to the image viewer 150. The image viewer 150 that has received the image data from the management server 140 then displays an image based on the received image data on a display 172. Display screen generation processing is performed in the management server 140 by performing a display screen generation program by operation of the CPU 162.

FIG. 11 is illustrates a screen displayed when the imaging date display field 322N1 is clicked, and is a screen in which a RG image and a choroidal vascular image are displayed for the fundus of the right eye (324R icon is illuminated) of a patient identified by the patient ID: 123456 as imaged on the imaging day of Jan. 1, 2016.

Figure 12:
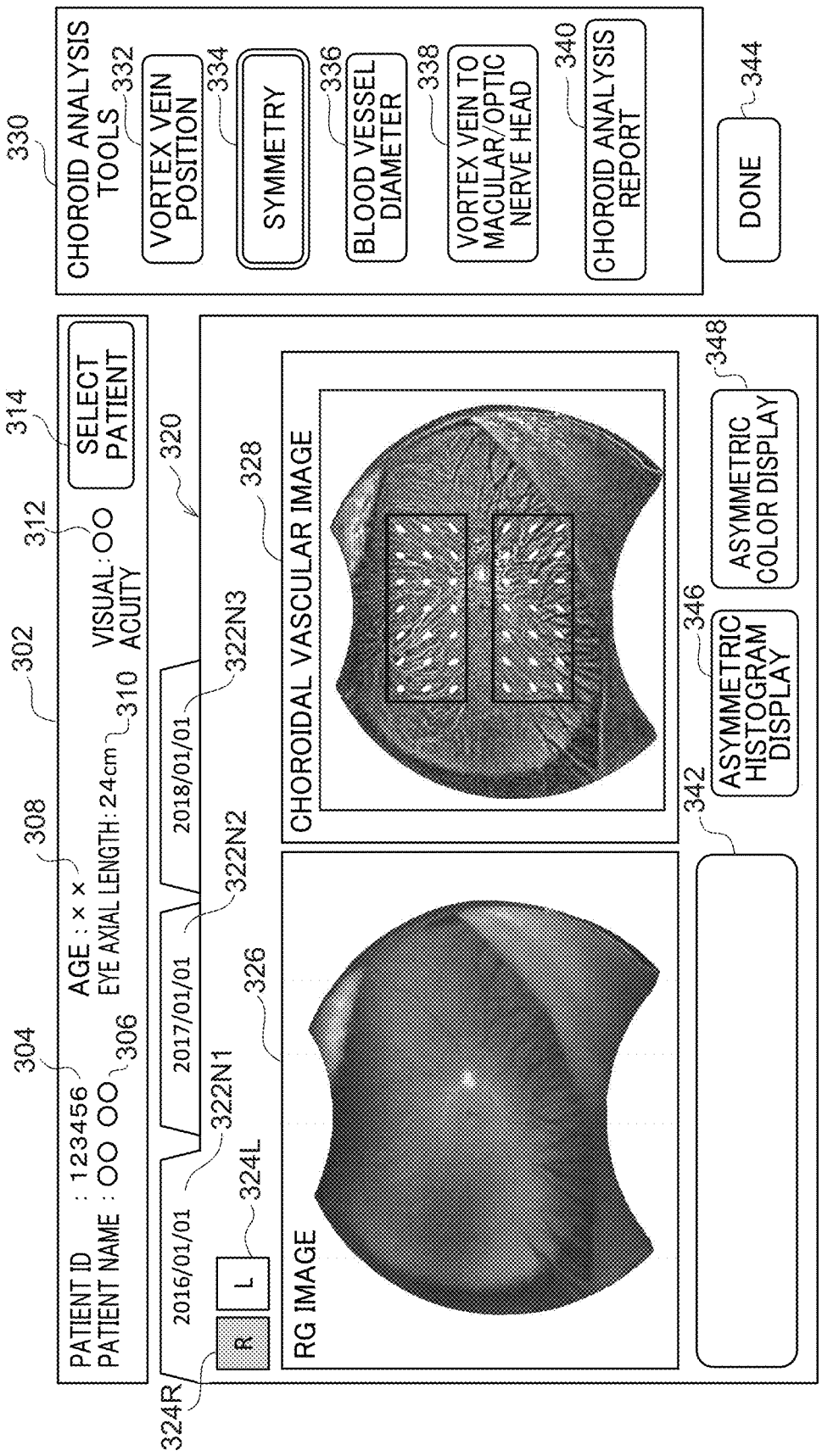
FIG. 12 is a diagram illustrating a display screen displayed when a symmetry icon 334 has been clicked on the display screen of FIG. 11.

When the symmetry icon 334 is clicked in the choroid analysis tool display field 330 of FIG. 11, the display screen is changed to display the analysis points illustrated in FIG. 12. As illustrated in FIG. 12, the image viewer 150 displays the respective pairs of analysis points as points on the choroidal vascular image displayed in the choroidal vascular image display field 328. Note that the image viewer 150 is not limited to displaying the respective analysis point pairs as points, and, as visualization of the characteristics of the analysis points, arrows UA1, UA11, DA1, DA11 (see FIG. 10) indicating the blood vessel running direction may be displayed, or elliptical marks or the like may be displayed instead of the arrows of as well as the arrows.

The asymmetric histogram display icon 346 and the asymmetric color display icon 348 are provided in the image display field 320 of the display screen of FIG. 12.

Figure 13:
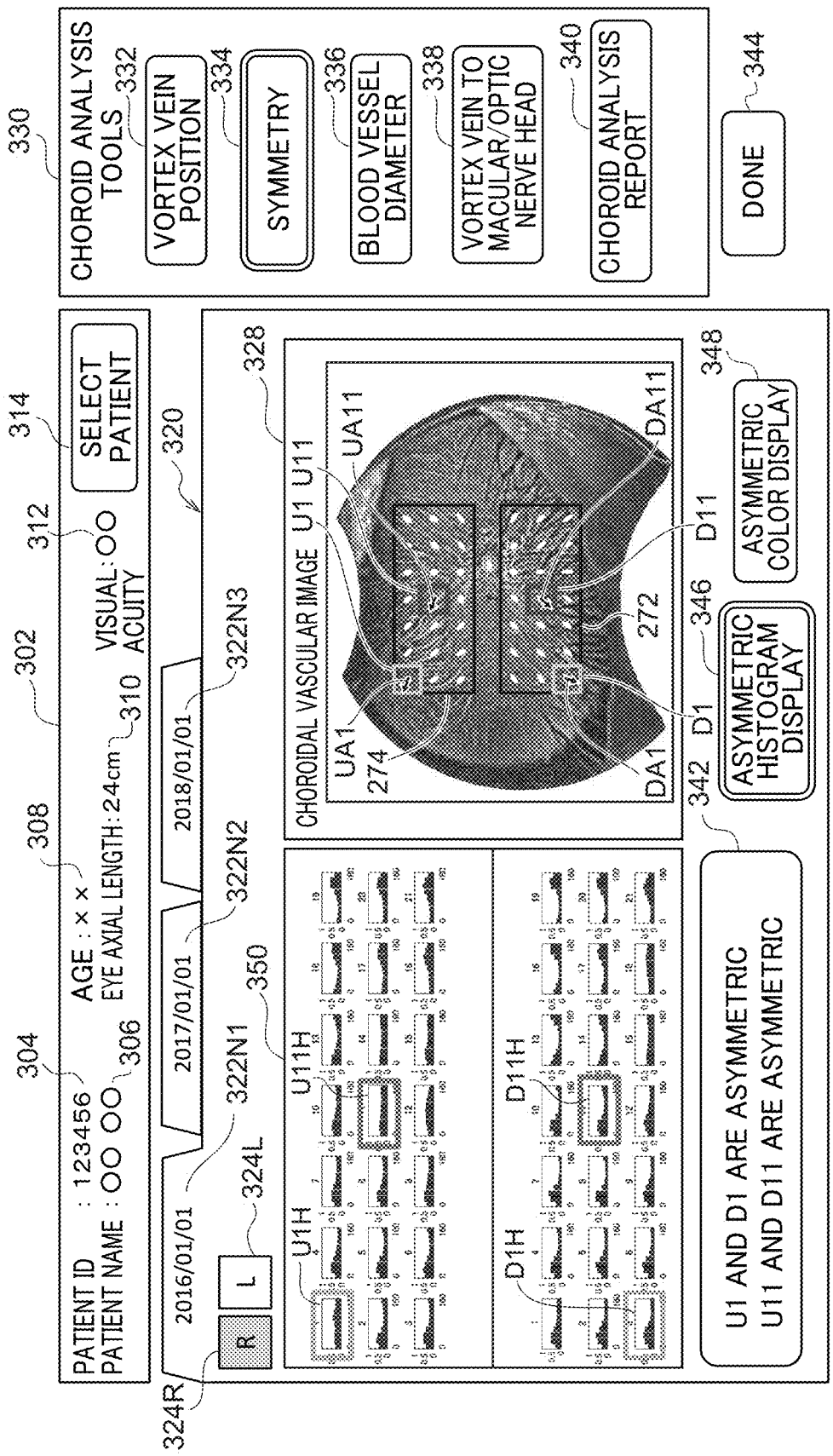
FIG. 13 is a display screen displayed when an asymmetry histogram display icon 346 has been clicked on the display screen of FIG. 12.

When the asymmetry histogram display icon 346 is clicked in the image display field 320 of the display screen of FIG. 12, a display which indicates the asymmetricity shows up. Specifically, as illustrated in FIG. 13, the image viewer 150 emphasizes the display in the choroidal vascular image display field 328 of the pairs of analysis points U1, D1, U11, D11 that are respective analysis points of pairs displayed in the choroidal vascular image for which the asymmetric indicator value ($\Sigma\Delta h^2$) is the specific value or greater. This emphasized display is performed, for example, by applying boxes thereto. Note that such boxes are applied with the same color for the same pair, and with a different color for a different pair. For example, respective boxes surrounding the analysis point U1 and the analysis point D1 are applied in a first color (for example, red), and respective boxes surrounding the analysis point U11 and the analysis point D11 are applied in a second color (for example, orange). Moreover, the image viewer 150 also displays on the choroidal vascular image arrows UA1, DA1, UA11, DA11 at angles of 60°, 160°, 50°, and 150° lying along the respective blood vessel running directions of the respective pairs of analysis points U1, D1, U11, D11. The arrows UA1, UA11 and the arrows UDA1 and DA11 are examples of a "first indicator" ("first arrow) and a "second indicator" (second arrow) of the technology disclosed herein.

Moreover, instead of the RG image display field 326, the image viewer 150 displays histograms of each of the analysis points in the histogram display field 350, and emphasizes the display of pairs of histograms for which the asymmetric indicator value ($\Sigma\Delta h^2$) is the specific value or greater. The analysis point numbers of asymmetric pairs are also displayed in the information display field 342.

In FIG. 13, the analysis point U1 and the analysis point D1, and the analysis point U11 and the analysis point D11, fall within the definition of asymmetric pairs. Thus in the choroidal vascular image display field 328, the image viewer 150 displays boxes of the same color for the same pair and boxes of different colors for other pairs, such that respective boxes surrounding the analysis point U1 and the analysis point D1 are both a first color (for example, red), and respective boxes surrounding the analysis point U11 and the analysis point D11 are both a second color (for example, orange).

In the histogram display field 350, the image viewer 150 displays boxes of the same color for the same pair and boxes of different colors for other pairs, such that respective boxes surrounding the histogram U1H of the analysis point U1 and the histogram D1H of the analysis point D1 are both a first color (for example, red), and respective boxes surrounding the histogram U11H of the analysis point U11 and the histogram D11H of the analysis point D11 are both a second color (for example, orange). The color of the boxes surrounding the analysis points in the choroidal vascular image display field 328 and the color of the boxes surrounding the histograms in the histogram display field 350, are the same color for the same analysis point number, thereby raising the visibility thereof.

In the information display field 342, the image viewer 150 displays the fact that the analysis point U1 and the analysis point D1, and the analysis point U11 and the analysis point D11, are asymmetric pairs, specifically by displaying text of "U1 and D1 are asymmetric", and "U11 and D11 are asymmetric".

A configuration may be adopted in which, when the asymmetric color display icon 348 is clicked on the image display field 320 of the display screen of FIG. 12, the display screen illustrated in FIG. 14 is displayed instead of the display screen of FIG. 13. The respective display screens of FIG. 13 and FIG. 14 are different only in the point that the histogram display field 350 is displayed in FIG. 13, and a color map display field 360 is displayed in FIG. 14 instead of the histogram display field 350. The color map display field 360 is colored differentially according to asymmetric indicator values ($\Sigma\Delta h^2$). Explanation follows regarding the color map display field 360 alone.

First, predetermined colors are associated with the magnitudes of the asymmetric indicator value ($\Sigma\Delta h^2$) and stored in the memory 164 of the image viewer 150. For example, darker colors are associated with asymmetric indicator values ($\Sigma\Delta h^2$) of larger magnitude. Moreover, the rectangular regions in the color map display field 360 are determined according to the respective analysis point numbers and positions.

Based on the magnitude of the asymmetric indicator value ($\Sigma\Delta h^2$) corresponding to each of the analysis points and the predetermined color associated with that magnitude of asymmetric indicator value ($\Sigma\Delta h^2$), the image viewer 150 displays rectangular regions corresponding to the analysis points, displayed in the color associated with the magnitude of the asymmetric indicator value ($\Sigma\Delta h^2$) corresponding to each of the analysis points.

Moreover, in the histogram display field 360, the image viewer 150 displays boxes of the same color around the rectangular regions corresponding the same pair of asymmetric analysis points, and boxes of a different color for other pairs. For example, boxes are displayed in a first color (for example, red) around the rectangular regions RU1, RD1 corresponding to the analysis points U1, D1, and boxes are displayed in a second color (for example, orange) around the rectangular regions RU11, RD11 corresponding to the analysis points U11, D11.

As described above, in the present exemplary embodiment, the choroidal vascular image is analyzed, the asymmetry of pairs of analysis points having line symmetry with reference to the straight line LIN joining the macular M and the optic nerve head together is analyzed, and pairs of asymmetric analysis point are displayed with emphasis. This enables the asymmetry in the running direction of the choroidal blood vessels to be ascertained. Furthermore, fundus diagnosis by an ophthalmologist can be supported by the visualization of asymmetry in choroidal blood vessel running direction.

Moreover, UWF-SLO images can be obtained with ultra-wide-angle of a range of 200° or greater for the angle about the eyeball center by using an SLO unit employing a wide-angle optical system. This enables analysis of asymmetry to be performed for a wide range including a peripheral area of the fundus by employing such UWF-SLO images.

Next, description follows regarding various modified examples of the technology disclosed herein.

First Modified Example

In the exemplary embodiment described above, the choroidal vascular image is divided into the first region and the second region by the straight line LIN joining the macular and the optic nerve head together, and the analysis points are disposed at positions in the first region and the second region having line symmetry with reference to the straight line LIN. However, the technology disclosed herein is not limited thereto. For example, the choroidal vascular image may be divided into a temporal region and a nasal region by a line (orthogonal line) orthogonal to the line LIN and having an origin at the midpoint between the macular and the optic nerve head. The analysis points may then be arranged at positions having line symmetry with reference to the orthogonal line. Furthermore, the choroidal vascular image may be divided by a line (intersecting line) having an origin at the midpoint between the macular and the optic nerve head and intersecting the straight line LIN at a specific angle, for example 45° or 135°, and the analysis points arranged at positions having line symmetry with reference to the intersecting line.

Second Modified Example

In the above exemplary embodiment the blood vessel running direction of the choroidal blood vessels is generated at each of the analysis points. However, the technology disclosed herein is not limited thereto. For example, a three-dimensional position of each pixel of the choroidal vascular image may be identified, and the blood vessel running direction of the choroidal blood vessels computed as a direction in three-dimensional space. Optical coherence tomography (OCT) volume (3D) data obtained using a non-illustrated OCT unit provided to the ophthalmic instrument 110 may employed to compute the three-dimensional positions and the directions in three-dimensional space.

Third Modified Example

Although in the exemplary embodiment described above the management server 140 executes the image processing program illustrated in FIG. 5 in advance, the technology disclosed herein is not limited thereto. The image viewer 150 may transmits an image processing command to the management server 140 when the symmetry icon 334 illustrated in FIG. 11 is clicked. Then in response thereto, the management server 140 may execute the image processing program of FIG. 5.

Fourth Modified Example

In the exemplary embodiment described above an example has been described in which a fundus image is acquired by the ophthalmic device 110 with an internal light illumination angle of about 200 degrees. However, the technology disclosed herein is not limited thereto, and the technology disclosed herein may be applied even when the fundus image has been imaged by an ophthalmic device with an internal illumination angle of 100 degrees or less, and may also be applied to a montage image obtained by combining plural fundus images.

Fifth Modified Example

In the exemplary embodiment described above the fundus image is imaged by the ophthalmic device 110 equipped with an SLO imaging unit. However, the technology disclosed herein may be applied to a fundus image imaged using a fundus camera capable of imaging the choroidal blood vessels, and to images obtained by OCT angiography.

Sixth Modified Example

Although in the above exemplary embodiment the asymmetry is analyzed from the choroidal blood vessel running direction, the technology disclosed herein may also be applied to analyze asymmetry from the retinal blood vessel running direction.

Seventh Modified Example

In the exemplary embodiment described above, the management server 140 executes the image processing program. However the technology disclosed herein is not limited thereto. For example, the image processing program may be executed by the ophthalmic device 110 or the image viewer 150.

Eighth Modified Example

The exemplary embodiment described above describes an example of the ophthalmic system 100 equipped with the ophthalmic device 110, the eye axial length measuring instrument 120, the management server 140, and the image viewer 150; however the technology disclosed herein is not limited thereto. For example, as a first example, the eye axial length measuring instrument 120 may be omitted, and the ophthalmic device 110 may be configured so as to further include the functionality of the eye axial length measuring instrument 120. Moreover, as a second example, the ophthalmic device 110 may be configured so as to further include the functionality of one or both of the management server 140 and the image viewer 150. For example, the management server 140 may be omitted in cases in which the ophthalmic device 110 includes the functionality of the management server 140. In such cases, the image processing program is executed by the ophthalmic device 110 or the image viewer 150. Moreover, the image viewer 150 may be omitted in cases in which the ophthalmic device 110 includes the functionality of the image viewer 150. As a third example, the management server 140 may be omitted, and the image viewer 150 may be configured so as to execute the functionality of the management server 140.

Other Modified Examples

The data processing described in the exemplary embodiment described above is merely an example thereof. Obviously, unnecessary steps may be omitted, new steps may be added, and the sequence of processing may be changed within a range not departing from the spirit thereof.

Moreover, although in the exemplary embodiment described above an example has been given of a case in which data processing is implemented by a software configuration utilizing a computer, the technology disclosed herein is not limited thereto. For example, instead of a software configuration utilizing a computer, the data processing may be executed solely by a hardware configuration of field programmable gate arrays (FPGAs) or application specific integrated circuits (ASICs). Alternatively, a portion of processing in the data processing may be executed by a software configuration, and the remaining processing may be executed by a hardware configuration.

What is claimed is:

1. An image processing method to be executed in a processing device, the method comprising:
    acquiring a fundus image stored in a memory;
    setting a reference line on the fundus image, and a first analysis point and a second analysis point on the fundus image so as to be symmetrical about the reference line;
    computing a first flow direction of a first blood vessel about the reference line on the fundus image based on the fundus image of brightness of a pixel at the first analysis point and brightness of surrounding pixels at the first analysis point;
    computing a second flow direction of a second blood vessel about the reference line on the fundus image based on the fundus image of brightness of a pixel at the second analysis point and brightness of surrounding pixels at the second analysis point; and
    comparing the first flow direction against the second flow direction on the fundus image;
    wherein comparing the first flow direction on the fundus image against the second flow direction on the fundus image comprises analysis of asymmetry between the first flow direction of the first blood vessel and the second flow direction of the second blood vessel about the reference line.

2. The image processing method of claim 1, wherein comparison of the first flow direction against the second flow direction is performed by quantifying asymmetry between a running direction of the first flow direction and a running direction of the second flow direction.

3. The image processing method of claim 1, wherein the first flow direction and the second flow direction relate to running directions of the choroidal blood vessels.

4. The image processing method of claim 1, wherein the first flow direction is derived based on a brightness gradient of pixels in a first specific region containing the first analysis point, and the second flow direction is derived based on a brightness gradient of pixels in a second specific region containing the second analysis point.

5. The image processing method of claim 1, further comprising generating an analysis screen displaying a first indicator indicating the first flow direction, a second indicator indicating the second flow direction, the fundus image, and an analysis result of analyzing asymmetry between the first flow direction and the second flow direction.

6. The image processing method of claim 5, wherein in the analysis screen, the first indicator is overlaid on the first analysis point of the fundus image, and the second indicator is overlaid on the second analysis point of the fundus image.

7. The image processing method of claim 5, wherein:
the first indicator is a first arrow corresponding to a running direction of the first blood vessel; and
the second indicator is a second arrow corresponding to a running direction of the second blood vessel.

8. The image processing method of claim 5, wherein:
the first indicator is a first histogram derived based on a brightness gradient of pixels in a first specific region containing the first analysis point; and
the second indicator is a second histogram derived based on a brightness gradient of pixels in a second specific region containing the second analysis point.

9. The image processing method of claim 5, wherein:
the first indicator is a first angle numerical value corresponding to a running direction of the first blood vessel; and
the second indicator is a second angle numerical value corresponding to a running direction of the second blood vessel.

10. The image processing method of claim 1, wherein:
the reference line is a straight line passing through a macular position and an optic nerve head position.

11. The image processing method of claim 1, wherein:
a plurality of first analysis points is set in a first region in the fundus image, and a plurality of second analysis points is set in a second region in the fundus image, the first region and the second region being line symmetric about the reference line;

the first flow direction of the first blood vessel is computed for each of the plurality of first analysis points, and the second flow direction of the second blood vessel is computed for each of the plurality of second analysis points; and a plurality of pairs of a first analysis point and a second analysis point that have line symmetry between the plurality of first analysis points and the plurality of second analysis points is defined, and a symmetry indicator indicating symmetry between the first flow direction and the second flow direction for each of the plurality of defined pairs is computed.

12. The image processing method of claim 11, further comprising extracting a pair in which the first flow direction and the second flow direction exhibit asymmetry based on the symmetry indicator indicating the symmetry of each of the plurality of defined pairs.

13. The image processing method of claim 12, further comprising generating an emphasized display image to emphasize display of the first analysis point and the second analysis point corresponding to the extracted pair exhibiting asymmetry.

14. The image processing method of claim 1, wherein the fundus image is obtained by a wide-angle optical system.

15. A non-transitory computer-readable medium storing an information processing program that causes a computer to:
acquire a fundus image stored in a memory;
set a reference line on the fundus image, and a first analysis point and a second analysis point on the fundus image so as to be symmetrical about the reference line;
compute a first flow direction of a first blood vessel about the reference line on the fundus image based on the fundus image of brightness of a pixel at the first analysis point and brightness of surrounding pixels at the first analysis point;
compute a second flow direction of a second blood vessel about the reference line on the fundus image based on the fundus image of brightness of a pixel at the second analysis point and brightness of surrounding pixels at the second analysis point; and
compare the first flow direction against the second flow direction on the fundus image;
wherein compare the first flow direction on the fundus image against the second flow direction on the fundus image comprises analysis of asymmetry between the first flow direction of the first blood vessel and the second flow direction of the second blood vessel about the reference line.

* * * * *